(12) United States Patent
Lasser et al.

(10) Patent No.: US 7,769,945 B2
(45) Date of Patent: *Aug. 3, 2010

(54) METHOD AND SYSTEM FOR FACILITATING FAST WAKE-UP OF A FLASH MEMORY SYSTEM

(75) Inventors: Menahem Lasser, Kohav Yair (IL); Meir Avraham, Rishon Lezion (IL)

(73) Assignee: Sandisk IL Ltd., Kfar Saba (IL)

( * ) Notice: Subject to any disclaimer, the term of this patent is extended or adjusted under 35 U.S.C. 154(b) by 430 days.

This patent is subject to a terminal disclaimer.

(21) Appl. No.: 11/808,451

(22) Filed: Jun. 11, 2007

(65) Prior Publication Data

US 2008/0177935 A1 Jul. 24, 2008

Related U.S. Application Data

(60) Provisional application No. 60/885,412, filed on Jan. 18, 2007.

(51) Int. Cl.
*G06F 12/08* (2006.01)
(52) U.S. Cl. ............................ 711/103; 711/206; 713/1
(58) Field of Classification Search ........................ None
See application file for complete search history.

(56) References Cited

U.S. PATENT DOCUMENTS

| | | | |
|---|---|---|---|
| 5,924,113 A | 7/1999 | Estakhri et al. | |
| 5,937,425 A | 8/1999 | Ban | |
| 6,510,488 B2 | 1/2003 | Lasser | |
| 6,678,785 B2 | 1/2004 | Lasser | |
| 7,191,306 B2 * | 3/2007 | Myoung et al. | 711/203 |
| 7,516,267 B2 * | 4/2009 | Coulson et al. | 711/103 |

FOREIGN PATENT DOCUMENTS

| | | |
|---|---|---|
| EP | 0973097 | 1/2000 |
| WO | 2007/072313 | 6/2007 |
| WO | 2007/072317 | 6/2007 |
| WO | 2007/072367 | 6/2007 |
| WO | 2007/096844 | 8/2007 |

OTHER PUBLICATIONS

HP Open VMS Systems Documentation Guide to Open VMS File Applications, http://h71000.www7.hp.com/doc/73final/4506/4506pro_025.html, printed Aug. 13, 2007, 7 pages.

International Search Report and Written Opinion; International Application No. PCT/IL2008/000062, dated Jan. 16, 2008.

* cited by examiner

*Primary Examiner*—Gary J Portka
(74) *Attorney, Agent, or Firm*—Toler Law Group

(57) ABSTRACT

Methods for maintaining data structures in accordance with the events of a nonvolatile memory system. At least part of one or more management tables and a future information data structure are stored in a nonvolatile memory. The future information data structure contains records of events expected to occur subsequent to the storing of the future information data structure. When flash memory events occur, those events are handled in accordance with the future information data structure. When the memory system wakes up, the management table(s) is/are retrieved and the records of the future information data structure are compared with the table(s) state. The table(s) is/are updated in accordance with the future information data structure.

20 Claims, 7 Drawing Sheets

For t=t₁      Translation Table 200

| Virtual Block | Physical Block |
|---|---|
| 0 | 893 |
| 1 | 485 |
| 2 | 172 |
| ⋮ | ⋮ |
| 1022 | 1 |
| 1023 | 985 |

FIG.2A

For t=t$_2$ where t$_2$>t$_1$    Translation Table 200

| Virtual Block | Physical Block |
|:---:|:---:|
| 0 | 893 |
| 1 | 485 |
| 2 | 777 |
| ⋮ | ⋮ |
| 1022 | 1 |
| 1023 | 985 |

FIG.2B

METHOD AND SYSTEM FOR FACILITATING FAST WAKE-UP OF A FLASH MEMORY SYSTEM

This patent application claims the benefit of U.S. Provisional Patent Application No. 60/885,412, filed Jan. 18, 2007

This application is related to U.S. patent application Ser. No. 11/808,452 of the same inventors, which is entitled "A METHOD AND SYSTEM FOR FACILITATING FAST WAKE-UP OF A FLASH MEMORY SYSTEM" and filed on the same day as the present application. The latter application, also claiming priority from U.S. Provisional Patent Application No. 60/885,412, is incorporated in its entirety as if fully set forth herein.

FIELD AND BACKGROUND OF THE INVENTION

The present invention relates to methods and systems for maintaining data structures that are useful for facilitating a wake-up of a flash memory system.

U.S. Pat. No. 6,510,488 of Lasser entitled "Method For Fast Wake-Up of a Flash Memory System" (hereinafter "Lasser '488") discloses a method and system for allowing a flash memory system to achieve a fast wake-up time after powering the flash memory system up even if the flash system software relies on management tables whose generation from scratch is time-consuming. This fast wake-up time is achieved without sacrificing data integrity. The aforementioned patent of Lasser '488 is incorporated by reference for all purposes as if fully set forth herein.

As explained in Lasser '488, using a flash memory device for computer data storage traditionally requires a software translation layer that sits between the host computer's operating system and the device low-level access routines. This is so because the flash technology has some usage limitations, which make the flash memory impossible to access in a simple random-access linear method. One such limitation is the inability to randomly overwrite any desired flash memory location. Specifically, the writing of new content into a flash memory location may require first erasing the whole block containing that location (preserving the contents of any other locations still needed), and only then writing the new content.

The translation layer presents to the hosting operating system a virtual view of a random-access addressable array of independent data sectors, while hiding and handling the details of mapping those virtual addresses into their real locations in the flash media. This translation mechanism is far from trivial, and an example of such a flash memory translation layer is disclosed in Amir Ban's U.S. Pat. No. 5,937,425, which is incorporated as if fully set forth herein. Ban discloses a method for implementing a mapping mechanism between virtual and physical flash addresses. Another example of such as system is detailed in U.S. Pat. No. 6,678,785, which is also incorporated by reference for all purposes as if fully set forth herein.

The translation process relies on internal translation tables that provide the flash system software with the information required for converting the host computer data access requests to the actual flash access requests. These translation tables are constructed by the flash memory system software during system wake-up (or at later time, if so requested by the hosting software), based on control information stored within the flash device. Even though it is theoretically possible not to construct such tables and instead to use only the raw control data from the flash memory, this is practically unusable as the response time to an access request would be too slow. This is so because accessing data on flash is much slower than accessing data in RAM memory, and also because the RAM memory tables are usually optimized for efficiency in the type of operations required during runtime, while the flash-stored control data is not.

For example, a flash physical unit might contain the number of the virtual unit mapped to it. During program runtime we may frequently need to translate a virtual unit number into its physical counterpart. If we have to rely only on flash-stored control data, we may need to scan the units until we find the unit with the specified virtual unit number, a very long process by the standards of a simple media access. However, by scanning the flash device once on system wake-up and constructing a table mapping each virtual unit number into a corresponding physical unit number, we are able to later do such mappings very efficiently.

The problem is that scanning the flash data storage device on system wake-up might take a long time, especially for high capacity devices. This is especially annoying for systems and devices in which a user expects immediate turn-on (i.e. cellular phones, PDAs, etc.). Simply storing the tables in the flash memory may work for read-only devices, such as flash devices storing only computer executable code that is not changeable by the user. However, merely storing the tables in flash memory will not succeed when using devices used to store data which might be changing frequently (such as text files or spreadsheets in a PDA). This is so because when continuously writing to the device and changing the device's contents, the contents of the translation tables also change. It is not practical to update the copy of the tables in the flash memory each time the tables change in RAM, because the incurred overhead will slow the system considerably. Consequently, a difference will be accumulated between the tables stored in flash memory and the "correct" ones in RAM. Now if the user switches the power off and then turns the power back on, without updating the tables, the software will read incorrect translation tables from flash memory, and the results might be data loss when writing new data.

According to some embodiments disclosed in Lasser '488, this problem is solved by storing translation tables in the flash memory and adding some means for the software to invalidate the translation tables in a way that is detectable whenever reading them. Possible implementations (but not the only implementations) include adding a checksum value that makes the sum of all entries equal some fixed known value, or adding a validity flag to the stored tables. Additionally, one should ask the application software to call a specific function in the translation layer before shutting the system down.

In these ways the flash memory device is able to initiate fast wake-ups when the system undergoes an orderly shut down, and reverts to regular wake-ups when the system undergoes an un-orderly shut down.

While this solution is useful for many cases, there are situations where this solution may not be adequate. A first example where the solution may not be adequate is when sudden power failures are frequent and it is expected that many (or even most) of the power-up events will encounter invalid stored tables and will result in regular wake-ups that are slow.

A second example where the solution may not be adequate is where the operating system of the appliance hosting the flash memory system does not provide the software application with a service for orderly device dismounting or shutting down. While complex operating systems like Linux do provide such service, there are many simpler and smaller operating systems that are designed for starting up the storage system upon power-on and never shut the operating system down. In such cases the methods of Lasser '488 will result in every power-up of the system doing a regular wake-up of the flash management system, gaining nothing from those methods.

A third example where the solution may not be adequate is where there is a strict limit on the length of the time interval between powering the system up and having the system ready for operation. So even if power failures are rare and almost all power-up cases result in a fast wake-up of the flash management system, it is still unacceptable that a power failure will cause a later regular power-up sequence, regardless of how rarely this occurs.

Because of the above inadequacies of Lasser '488, U.S. patent application Ser. No. 11/382,056 to Lasser (hereinafter "Lasser '056") discloses another solution to the problem of a fast wake-up of flash management systems. The aforementioned application of Lasser '056 is incorporated by reference for all purposes as if fully set forth herein.

Lasser '056 discloses a technique whereby one or more flash management tables are updated and saved in flash memory after some but not after all events of the flash memory system. When waking up, if it turns out that a given flash management table stored in the flash memory contains out-of-date information, it is still possible to use the stored table(s) to facilitate system wake-up, and there is no requirement to invalidate the out-of-date table. Instead of invalidating this table, the out-of-date flash management table saved in flash memory before shut down and/or power loss may, when waking up, be used to re-construct the "proper" table (i.e. reflecting a current state of the system)

This is carried out by concurrently maintaining in flash memory an events log. When waking up, data stored in the events log are used to update the flash memory table and thereby maintain data integrity even if there was not an orderly exit before loss of power or shut-down. In most cases, the deriving of an "up-to-date" from an "out-of-date" table stored in flash memory using an events log is faster than the constructing of an up-to-date table by scanning the flash storage device.

A drawback of Lasser '056 is that it requires maintaining an events log in the flash memory. While in some flash management systems this is not a real drawback because an events log is already maintained for other reasons, there are many flash management systems in which an events log is not otherwise required, making the use of the methods of Lasser '056 costly in write performance.

There is thus a widely recognized need for, and it would be highly advantageous to have, a method and system that can provide a method for fast wake-up of a flash memory system, without compromising the integrity of the flash data structures and without sacrificing performance.

DEFINITIONS

For the purpose of the present disclosure, the term "block" is defined as the smallest unit of the flash memory that can be erased in a single operation. The term "page" is defined as the smallest unit of flash memory that can be written (also called "programmed" for historical reasons) in a single operation. Typically, a block contains many pages.

For the purpose of the present disclosure, the terms "flash management system" and "flash file system" are synonyms and are used interchangeably. Each of these terms refers to a software module that manages the storage of data in a flash memory device, regardless whether the interface exported by the module is file-oriented (with commands like "open file" or "write file") or block-oriented (with commands like "read block" or "write block"), and regardless whether the software module runs on a controller dedicated solely for flash management or on the same host computer on which the applications using the storage system are running.

For the purpose of the present disclosure a "flash management table" is any table containing data used by a flash management system for supporting the operation of the flash management system algorithms, where the data in the table at any specific point in time represents some aspect of the state of the flash memory system at that specific time. For example, if the flash management table is a table containing a bit per each block of the flash memory, with the bit indicating whether or not the corresponding block is free to be used, then the contents of the table at a first point of time are a first pattern of bits that represents the aspect of the state of the system regarding which of the blocks are free and which are not free at that time. At a later point of time the pattern of bits in that table could be the same, or may be different than in the first point, implying a different mix of free and non-free blocks caused by some free blocks becoming non-free and some non-free blocks becoming free.

For the purpose of the present disclosure an "event" is any write request, erase request, or housekeeping request, to the flash memory from an entity that controls the flash memory. The entity could be a flash memory controller as illustrated below in FIG. 1, a general purpose CPU as illustrated below in FIG. 5, or a flash memory controller and a general purpose CPU acting cooperatively, as illustrated below in FIG. 6.

For the purpose of the present disclosure a "selected event" is an event selected by the flash memory system designer to generate one or more updates to one or more memory management tables.

SUMMARY OF THE INVENTION

Some or all of the aforementioned needs, and other needs, are satisfied by several aspects of the present invention.

The present invention includes a method, for achieving the above need, that stores in flash memory information related to future events of the flash memory system. For example, when storing into flash memory the current value of a virtual-to-physical address translation table, the system also stores with the table a list of the next few physical blocks that are to be used in the future when events in the system will require allocation of new free physical blocks.

At a later time an event in the system (such as a write request) may cause the allocation of a new physical block that is to replace another physical block as the corresponding block of some virtual block, resulting in a change in the state of the address mapping flash management table. When such event occurs, the flash management system will allocate as the newly assigned block the block that is at the head of the stored list. After completing the handling of the write request the stored copy of the table is no longer up-to-date, as the mapping of the virtual block effected by the write operation is out-of-sync with the true state of the system.

When the system wakes up, the stored copy of the management table is first loaded. At this stage we cannot be certain that the table correctly reflects the state of the system, as it is possible that a few events prior to the system's shut-down caused several incompatibilities between the stored table and the correct table. However, the "future information" stored in the flash memory and associated with the stored table provides enough information for correcting the stored table and reconstructing the correct up-to-date version of the table.

This is possible because we know that any allocation of physical blocks that had altered the mapping state (if there was one) must have used the physical blocks appearing in the list. Furthermore—the blocks must have been consumed strictly according to their order in the list. Therefore, in order to know if the stored table is up-to-date or not, it suffices to check the system's state with regard to the physical block that is at the head of the list. If this first block is found to still be free—no new allocation has happened, and the table is up-to-date. But if it is found that the first block of the list is not free any more—some change of state must have occurred in the system and the table is not up-to-date. In such case we find the update that must be applied to the table to reflect the allocation of the first block of the list and update the table's copy in RAM. If the first block is found to be in use, then we move on to successively make the same test for the next blocks in the list, repeating the same logic again and again. This is repeated until we encounter a block in the list that was not used yet or until we reach the end of the list.

Finding whether a block is currently in use and finding the changes that must be applied to the table in case the block is in use requires accessing control data stored in the flash memory, possibly within the relevant block itself. As slow as flash memory access might be compared to RAM access, the method of the current invention requires only a few flash memory accesses as only blocks in the "future list" are examined, and typically only some of the blocks are actually examined according to the above logic. Therefore, the present method for generating an up-to-date version of a flash management table from an out-dated version of the table is much faster than a full reconstruction of the table by a full scan of all flash memory blocks.

In a way the present invention can be looked at as an analog of the method of Lasser '056. Both methods reconstruct an up-to-date version of a management table from a stored copy of the table with the help of additional flash-stored information. But while in Lasser '056 the additional data are an events log, in the present invention the additional data are a list related to "future events". In Lasser '056 the additional information is stored at a time that is later than the time of storing the table into flash memory, while in the present invention the additional information is, typically, stored at the same time the table is stored into flash memory.

There is now disclosed for the first time a method of maintaining data structures of a memory system in accordance with events of the system, including the steps of (a) storing, in a nonvolatile memory of the memory system, at least a portion of at least one management table whose contents indicate a state of the memory system at a first point in time; (b) storing in the nonvolatile memory a future information data structure including a plurality of records related to events of the memory system expected to occur subsequent to the storing of the information data structure; and (c) at a second point in time subsequent to the first point in time, handling an event in accordance with the future information data structure.

Preferably, the nonvolatile memory is a flash memory. According to some embodiments, the storing of the at least a portion of the at least one management table includes updating the at least a portion of the at least one management table in the nonvolatile memory.

According to some embodiments, the storing of the at least a portion of at the at least one management table, whose contents indicate the state of the memory system at the first point in time, also includes storing the at least a portion of the at least one management table in a volatile memory of the memory system. The updating is effected every N>1 times that one of the at least a portion of the at least one management table is changed in the volatile memory. Other ways of doing the updating, include in response to selected events, updating periodically, and updating according to availability of resources of the memory system.

According to some embodiments, the future information data structure includes a list of blocks of the nonvolatile memory that are free at the first point in time.

There is now disclosed for the first time a method of waking up a memory system, including the steps of: (a) reading, from a nonvolatile memory of the memory system, at least a portion of at least one management table describing a state of the memory system at a point in time prior to the waking up; (b) reading, from the nonvolatile memory, a future information data structure including a plurality of records related to events expected to occur subsequent to a storing of the future information data structure; and (c) updating the at least portion of the at least one nonvolatile management table in accordance with at least one record of the future information data structure.

According to some embodiments, the nonvolatile memory is a flash memory.

According to some embodiments, the updating changes the at least a portion of the at least one management table to describe a current state of the memory system. The updating is conditional. For example, if the exit was orderly, the update need not be done. For example, according to some embodiments, the method further includes the step of comparing the a plurality of records to the nonvolatile memory to determine whether the state of the memory system has changed since the point in time, the updating then being conditional on the state of the memory system having changed since the point in time.

There is now disclosed for the first time a memory module including (a) a first nonvolatile memory; and (b) a controller of the nonvolatile memory that is operative to manage the first nonvolatile memory by steps including (i) storing in the first nonvolatile memory at least a portion of at least one management table whose contents indicate a state of the memory system at a first point in time, (ii) storing in the first nonvolatile memory a future information data structure including a plurality of records related to events of the memory system expected to occur subsequent to the storing of the future information data structure, and (iii) at a second point in time subsequent the storing of the future information data structure, handling the event in accordance with the future information data structure.

According to some embodiments, the module further includes a second nonvolatile memory; and the controller is operative to effect the steps by executing code stored in the second nonvolatile memory.

There is now disclosed for the first time a memory system including: (a) a memory module including a nonvolatile memory; and (b) a host, of the memory module, that participates in managing the nonvolatile memory by steps including: (i) storing in the first nonvolatile memory at least a portion of at least one management table whose contents indicate a state of the memory system at a first point in time, (ii) storing in the first nonvolatile memory a future information data structure including a plurality of records related to events of the memory system expected to occur subsequent to the storing of said information data structure, and (iii) at a second point in time subsequent to the storing of the future information data structure, handling an event in accordance with the future information data structure.

According to some embodiments, the steps are effected only by the host. According to other embodiments, the memory module also includes a controller that cooperates with the host to effect the steps.

There is now disclosed for the first time a memory module including: (a) a first nonvolatile memory; and (b) a controller of the nonvolatile memory that is operative to wake up the memory module by steps including (i) reading, from the first nonvolatile memory, at least a portion of at least one management table describing a state of the memory module at a point in time prior to the waking up (ii) reading, from the nonvolatile memory, a future information data structure including a plurality of records related to events expected to occur subsequent to the point in time; and (iii) updating the at least a portion of the at least one flash management table in accordance with at least one record of the future information data structure.

According to some embodiments, the memory module further includes: a second nonvolatile memory; and the controller is operative to effect the steps by executing code stored in the second nonvolatile memory.

There is now disclosed for the first time a memory system including: (a) a memory module including a nonvolatile memory; and (b) a host, of the memory module, that participates in managing the nonvolatile memory by steps including: (i) reading, from the nonvolatile memory, at least a portion of at least one management table describing a state of the memory system at a point in time prior to the waking up; (ii) reading, from the nonvolatile memory, a future information data structure including a plurality of records related to events expected to occur subsequent to the storing of the future information data structure; and (iii) updating the at least one management table in accordance with at least one record of the future information data structure.

According to some embodiments, the steps are effected only by the host. According to other embodiments, the memory module also includes a controller that cooperates with the host to effect the steps.

There is now disclosed for the first time a computer-readable storage medium having computer-readable code embodied therein for maintaining data structures of a memory system in accordance with events of the system, the computer-readable code including: (a) program code for storing, in a nonvolatile memory of the memory system, at least a portion of at least one management table whose contents indicate a state of the memory system at a first point in time; (b) program code for storing in the nonvolatile memory a future information data structure including a plurality of records related to events of the memory system expected to occur subsequent to the storing of the future information data structure; and (c) program code for: at a second point in time subsequent to the storing of the future information data structure, handling the event in accordance with the future information data structure.

There is now disclosed for the first time a computer-readable storage medium having computer-readable code embodied therein for waking up a memory system, the computer-readable code including: (a) program code for reading, from a nonvolatile memory of the memory system, at least a portion of at least one management table describing a state of the memory system at a point in time prior to the waking up; (b) program code for reading, from the nonvolatile memory, a future information data structure including a plurality of records related to events expected to occur subsequent to a storing of the future information data structure; and (c) program code for updating the at least a portion of the at least one management table in accordance with at least one record of the future information data structure.

BRIEF DESCRIPTION OF THE DRAWINGS

FIGS. 2A-2B provide an illustration of an exemplary translation table in accordance with some embodiments of the present invention;

DESCRIPTION OF THE PREFERRED EMBODIMENTS

The present invention will now be described in terms of specific, exemplary embodiments. It is to be understood that the invention is not limited to the exemplary embodiments disclosed. It should also be understood that not every feature of the presently disclosed methods, devices and computer-readable codes for maintaining data structures in accordance with events of a flash memory system is necessary to implement the invention as claimed in any particular one of the appended claims. Various elements and features of devices are described to fully enable the invention. It should also be understood that throughout this disclosure, where a process or method is shown or described, the steps of the method may be performed in any order or simultaneously, unless it is clear from the context that one step depends on another step being performed first.

The presently disclosed methods, systems and computer-readable codes for maintaining data structures are useful for facilitating a "fast-wakeup" of the flash memory system, for example, in environments in which frequent power failures are encountered. Nevertheless, this should not be construed as a limitation of the present invention, and is merely disclosed as one non-limiting application of the presently disclosed techniques for maintaining flash memory system data structures.

More specifically, presently disclosed techniques are used to provide a fast wake-up of a flash management system, even under conditions in which unexpected power failures frequently occur, without sacrificing data integrity.

Figure 1:
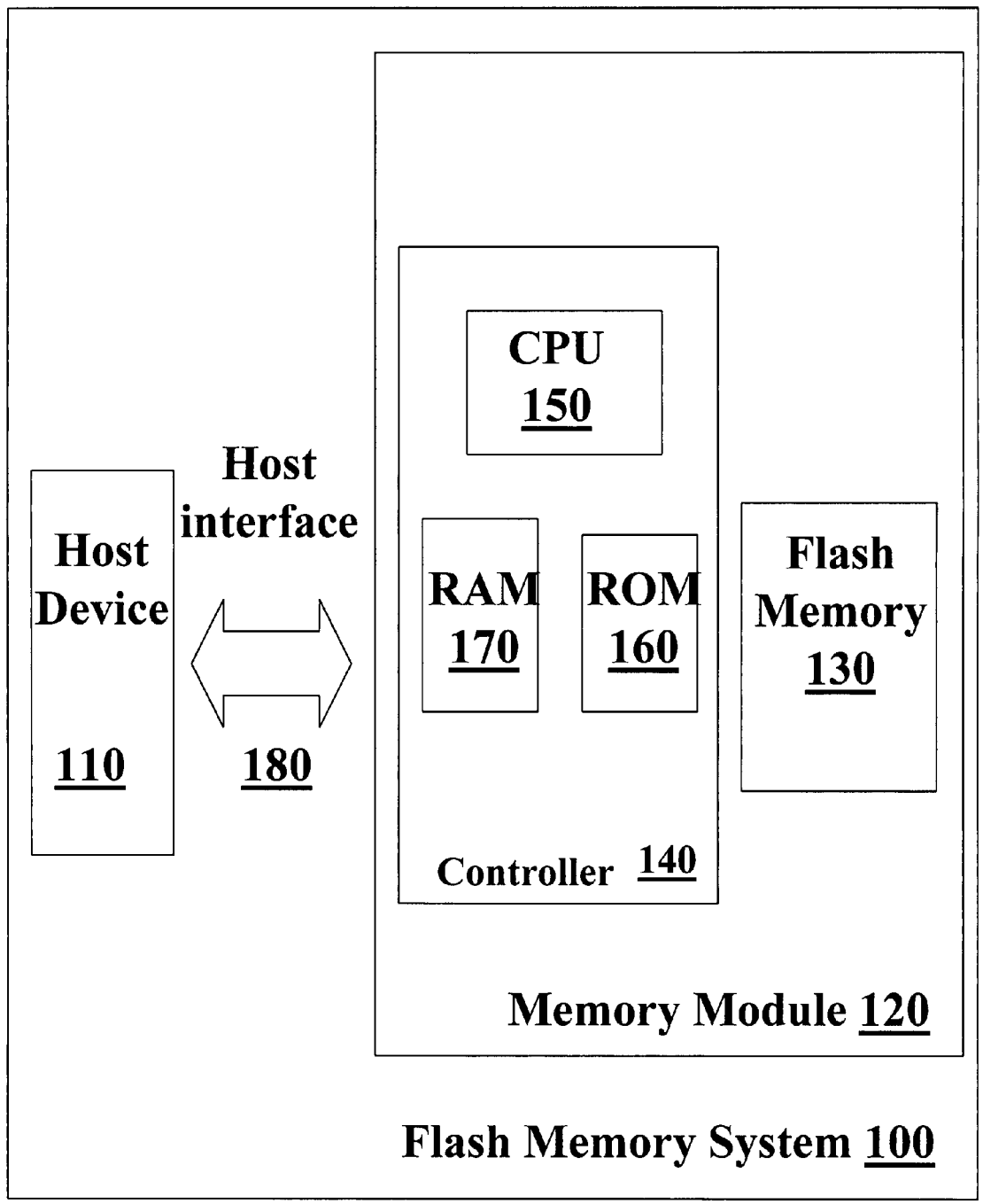
FIG. 1 is a block diagram of an exemplary flash memory system in accordance with some embodiments of the present invention.

Referring now to the drawings FIG. 1 is a block diagram of a non-limiting exemplary flash memory system 100 in accordance with some embodiments of the present invention. Exemplary system 100 includes a memory module 120 for storing data, and a host device 110 (examples of host device 110; a microcomputer, a smart card terminal, digital camera, cellular phone, PDA or any other device) that communicates with the memory module 120 via a host interface 180.

Memory module 120 includes a flash memory 130 that may be of any type, as well as a controller 140 that accesses flash memory 130 in accordance with read and/or write requests received through host interface 180. For the example illustrated in FIG. 1, controller 140 includes a CPU 150, a ROM 160 (where the code executed by CPU 150 is stored), and a RAM 170 that is used by the CPU 150 for supporting the execution of the code by controller 140.

This block diagram of the non-limiting example FIG. 1 is representative of typical nonvolatile storage modules, such as SecureDigital flash memory cards or portable USB flash drives.

Figure 5:
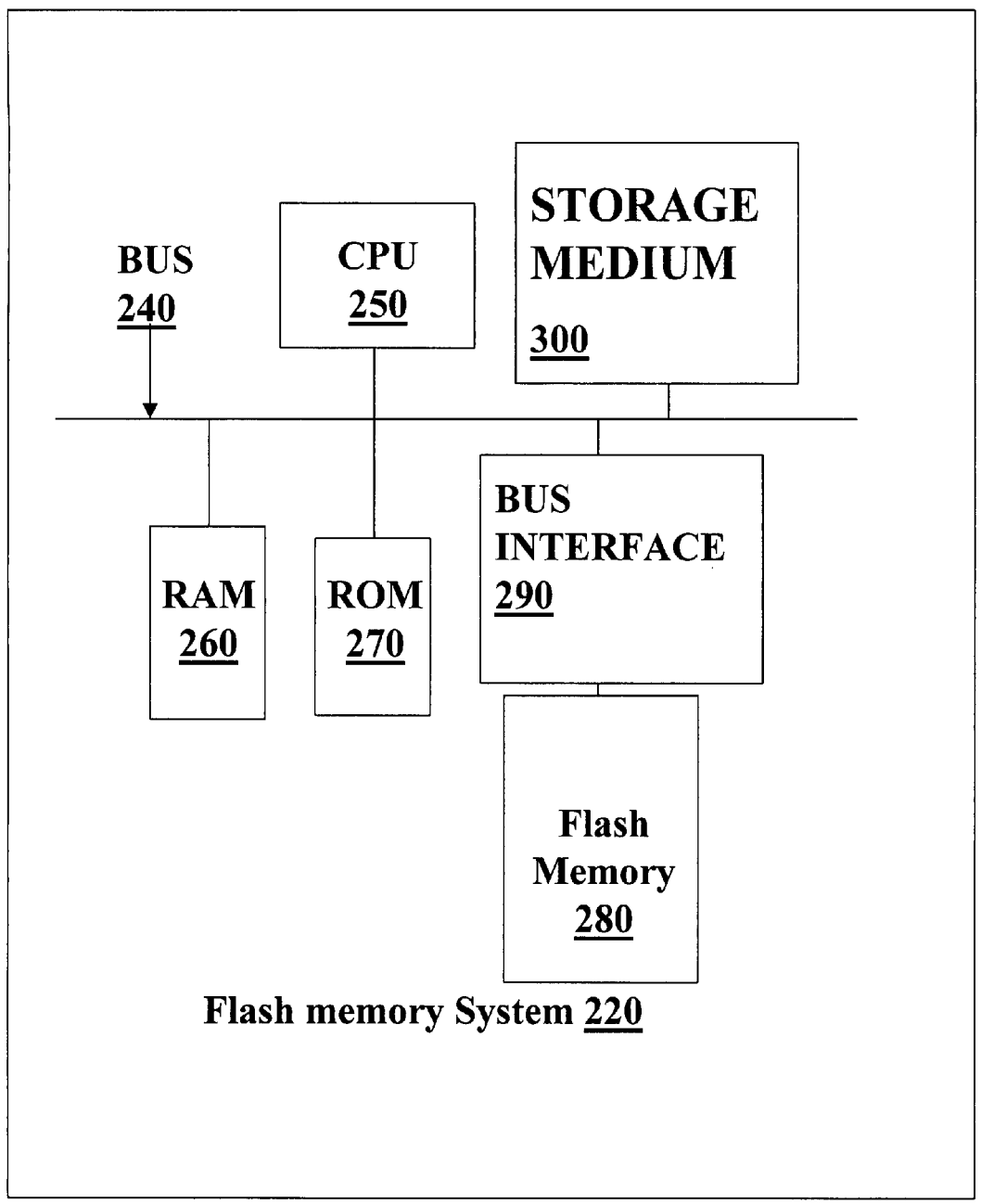
FIGS. 5 and 6 are block diagrams of more exemplary flash memory systems in accordance with some embodiments of the present invention.

FIG. 5, in the drawings, is a block diagram of another non-limiting exemplary flash memory system 220 in accordance of some embodiments of the present invention. Exemplary flash memory system 220 includes a general purpose CPU 250, a RAM 260, the flash memory 280, a bus interface 290 to flash memory 280, a boot ROM 270, a storage medium device 300, and a bus 240 that interconnect the various other components with each other. When system 220 powers up, the system bootstraps from ROM 270, then computer code and data are loaded from storage medium 300 into RAM 260. Also loaded from storage medium 300 is emulation code that controls flash memory 280. Bus interface 290 accesses flash memory 280 according to read and/or write requests received from CPU 250. Storage medium 300 is an example of a computer-readable storage medium bearing computer code for implementing the methods of the present invention. Typically, storage medium 300 is a hard disk or a flash memory device. Other examples of such computer-readable storage media include CDs, DVDs, diskettes etc. Unlike exemplary flash memory system of FIG. 1, this exemplary flash memory system 220 has no flash memory controller (that controls the flash memory system). Instead, the CPU 250 loads controller emulation code from mass storage 300 to RAM 260 and then CPU 250 executes the code from RAM 260 emulating the controller 140 in FIG. 1. Savings of flash management tables and their recovery and reconstruction upon power up and other flash management functions are all performed by emulation code executed by CPU 250.

Figure 6:
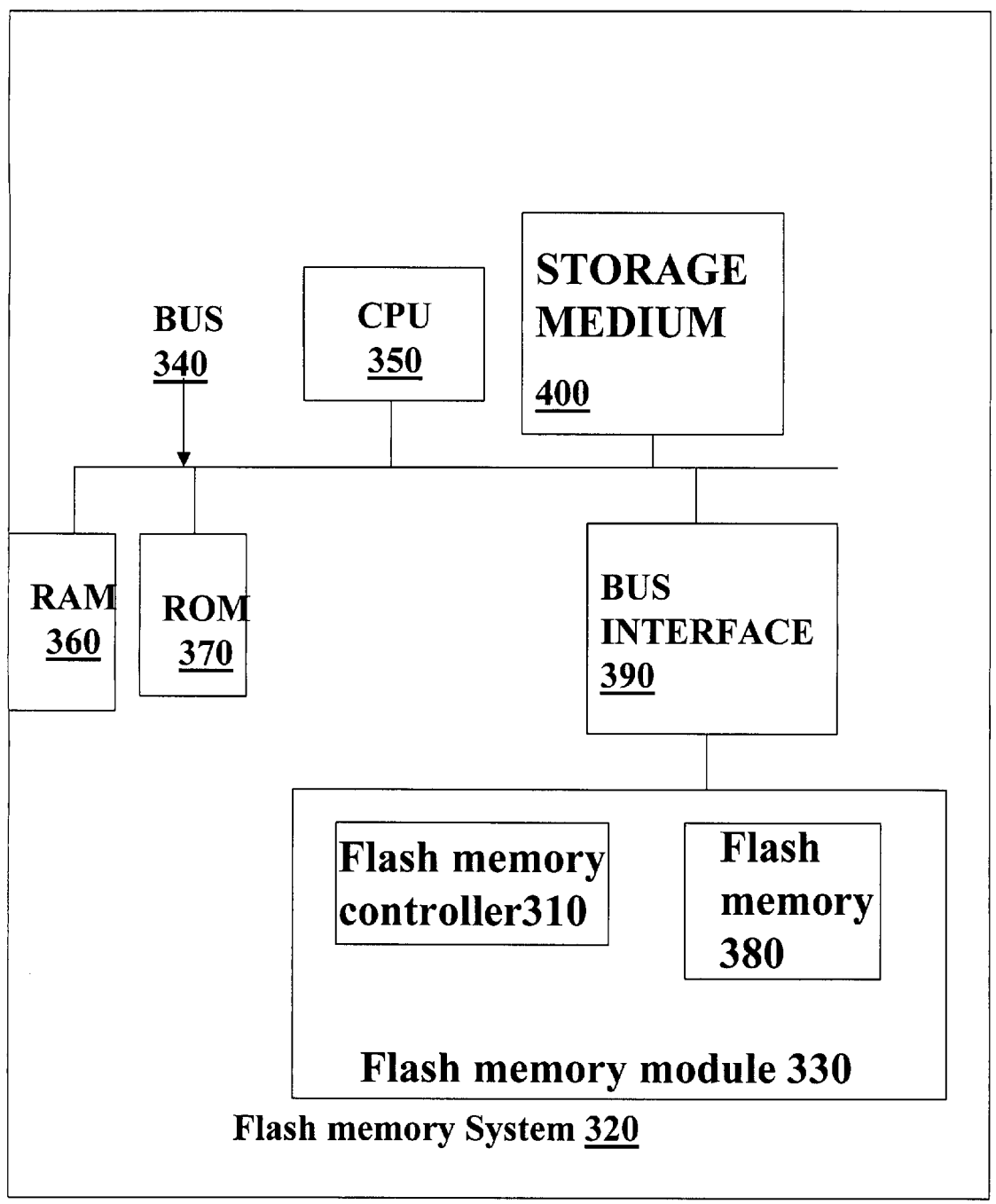

FIG. 6, in the drawings, is a block diagram of another non-limiting exemplary flash memory system 320 in accordance of some embodiments of the present invention. Exemplary system 320 includes a general purpose CPU 350, a RAM 360, a flash memory module 330, a flash memory controller 310, flash memory 380, a bus interface 390 to the flash memory module 330, a boot ROM 370, a storage medium 400, and a bus 340 that interconnect the various other components with each other. When system 320 powers up, the system bootstraps from ROM 370, then computer code and data are loaded from storage medium 400 into RAM 360. Also loaded from storage medium 400 is emulation code that controls flash memory module 330. Bus interface 390 accesses flash memory 380 according to read and/or write requests received from CPU 350. Like storage medium 300, storage medium 400 is an example of a computer-readable storage medium bearing computer code for implementing the methods of the present invention. Unlike exemplary flash memory system of FIG. 5, this exemplary flash memory system 320 also has, in flash memory module 330, a flash memory controller 310 that cooperates with CPU 350 to control flash memory system 380. CPU 350 loads controller emulation code from storage medium 400 to RAM 360 and then CPU 350 executes the code from RAM 360 emulating some of the controller 140 functions in FIG. 1. Saving of flash management tables and their recovery and reconstruction upon power up and other flash management functions are performed jointly by controller 310 and CPU 350.

Flash Management Tables

It is noted that flash memory system 100 typically stores one or more flash management tables in a volatile memory, for example, in RAM 170 of memory module 120, in RAM of host device 110, or in some other appropriate location. One non-limiting example of such a flash management table is a translation table that provides an address translation from a virtual block number to a physical block number. This is a mapping that exists in many flash management systems, as for example in the system of U.S. Pat. No. 5,937,425. It is noted that the same concepts and methods are also applicable to many other types of flash management tables, for example, to an allocated blocks table that represents which blocks are currently allocated and are not free to be used and which blocks are not allocated, to a table that represents a mapping from a virtual block number into a group of one or more physical block numbers, etc.

Over time, the data stored in the flash memory may change, and various ancillary data related to the flash memory may also change. The "state" of the flash memory system changes over time as different events (for example, write requests, housekeeping operations, etc) of the flash management system occur.

It is noted that each flash management table represents one or more aspects of a total "state" of the flash management system. Thus, any given flash management table or set of tables does not necessarily represent the full state of the system, just one or more aspects of the system. In the example of a free blocks table mentioned above, the knowledge of which blocks are free and which blocks are not free is certainly not enough for defining the complete state of the system. A non-free block may contain just a single used page, or some or all of the pages of a non-free block may be written with valid data. This is not reflected by the free blocks table but by either other flash management tables or by some other means, but still that table does represent an aspect of the system state and therefore falls within the definition of a flash management table.

Thus, when particular flash memory table(s) representing a "current state" or an "earlier state" or a "later state" or a "most recent state" of the flash memory system are stored in volatile or non-volatile memory, this represents an "earlier" or "current" or "later" or "most recent" state of the aspects of the flash memory system represented by the particular flash memory table(s).

Over time, a flash management table moves among a sequence of states, each state representing, at a given time, one or more aspects of the flash memory system at the time. The aspect of the state of the system that is modeled by the table switches among discrete states with clear-cut transition points that correspond to events of the flash memory system.

An Exemplary Flash Management Table

FIG. 2A shows the contents of an exemplary flash management table that maps virtual block numbers into physical block numbers at a first point in time ($t=t_1$). The table is indexed by virtual block number and lists the physical block number that currently contains the data of the corresponding virtual block. In practical implementations there often is no need to allocate space for storing the virtual block numbers as the table is ordered by those virtual block numbers and therefore can be directly indexed to the correct entry. However, for the convenience of presentation the table is shown as if both columns are physically represented.

The state of the virtual-to-physical mapping represented in FIG. 2A is such that if virtual block number 2 has to be accessed, then the table tells us the corresponding physical block is block number 172. At some point in time commands sent to the flash management system (or internal housekeeping operations taken by the system even without external commands, such as garbage collection operations) may cause the mapping to change. For example, a command that writes new data into virtual block number 2 and thus over-writes the previous data of virtual block number 2 may cause the flash management system to assign another physical block to correspond to virtual block number 2, and the new data are stored into that block.

FIG. 2B shows the contents of the virtual-to-physical flash management table at a later time ($t=t_2$) after that change occurred. Now virtual block number 2 corresponds in the table to physical block number 777 and no longer to physical block 172. Thus, the table has switched from a first state to a second state. Any change in the contents of a flash management table is defined as a state change of that table.

It should be emphasized that it is not the case that every write operation occurring in the flash management system causes a change of state in all the flash management system's flash management tables. For example, if physical block 172 had some of its pages unused and a write operation is directed to virtual block number 2, such that according to the algorithms of the flash management system the new data are stored into those unused pages of physical block 172, then no change is made to the virtual-to-physical mapping and the table remains unchanged following that write operation. Thus the rate of a flash management table state changes is typically lower than the rate of operations carried out within the system. Also, if multiple flash management tables are maintained within the same flash management system (each table representing a different aspect of the system's state), then each of the tables may change its state at different points in time.

Storing Future Information Data Structures that are Useful when Waking Up

As explained above, when initializing the system after a power-up, it is often necessary for the management software to create in RAM (e.g. in RAM 170) a fully updated copy of any flash management table that the management software uses. In order to achieve a fast wake-up of the system, it is usually not acceptable to regenerate the contents of the tables only from data scattered throughout the blocks of the storage system, as this is too slow. The opposite alternative of saving a copy of a table into the flash memory each time the table's state changes is also not acceptable because saving a copy of a table into flash memory each time its state changes adds a high overhead and reduces the system performance.

Techniques provided by various embodiments of the present invention provide a compromise between these two prior art approaches. Thus, a flash management table, generally, is saved into the flash memory only for some state changes, but not every time there is a state change.

Figure 3:
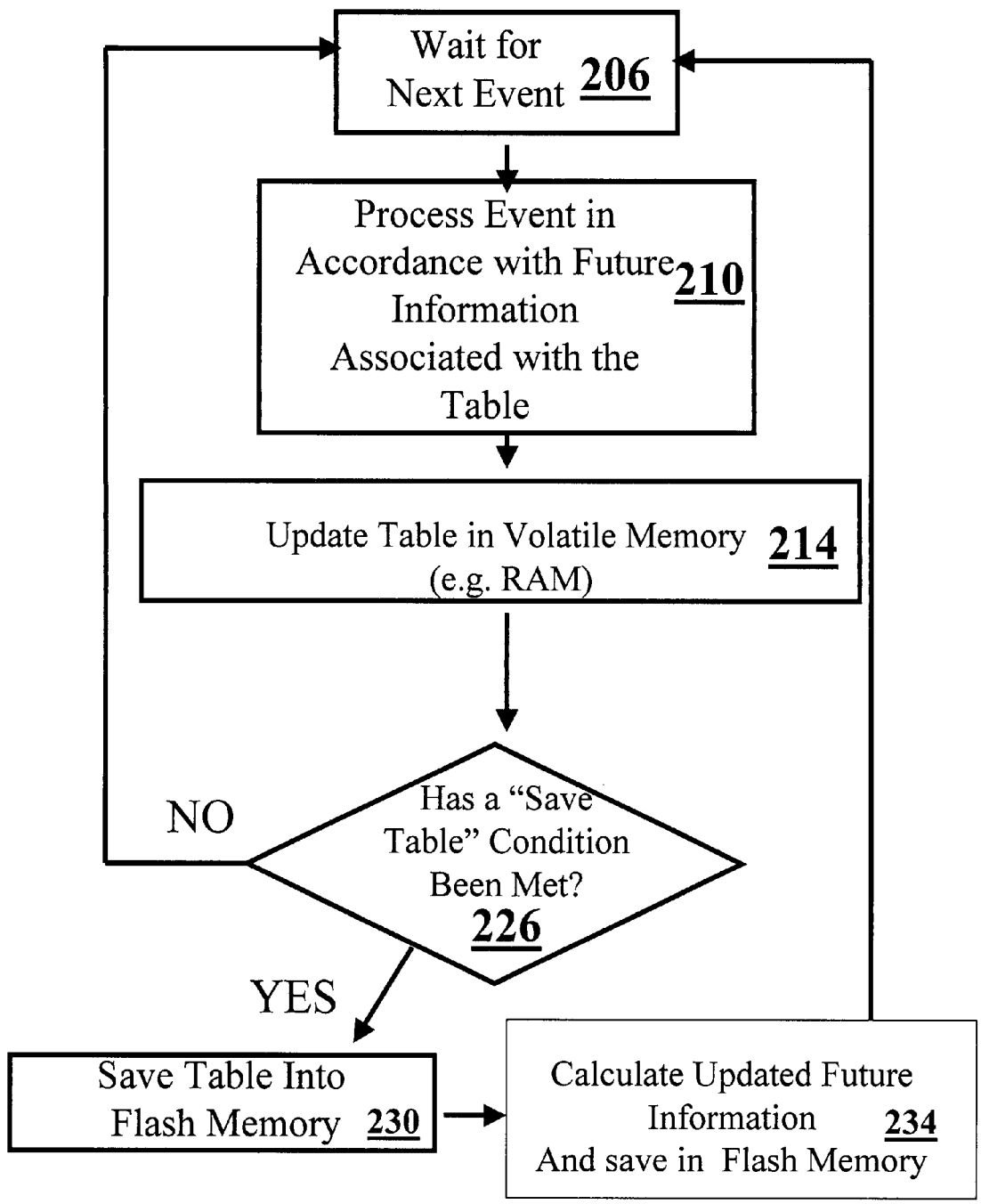
FIG. 3 is a flow-chart of the maintaining in flash memory of a flash management table and a future information data structure in accordance with an embodiment of the present invention.

This is illustrated in FIG. 3, which is a flow chart of an exemplary routine for maintaining, in flash memory, data structures of the flash management system in accordance with some embodiments of the present invention. As used herein, 'maintaining in flash memory' includes storing in flash memory. Typically, maintaining in flash memory includes maintaining the table and/or relevant data for populating the table in volatile memory/RAM, and, at a plurality of points in time, saving in flash memory an updated version of the table (i.e. a table synchronized to a current state of the flash memory system).

In accordance with the non-limiting embodiment of FIG. 3, it is noted that in non-limiting embodiments, at some points in time, the system is idle, and the system waits 206 for a next event. Upon processing 210 an event of the flash management system, one or more tables typically are updated 214 in volatile memory in accordance with the event that has occurred. These table(s) may or may not be updated in flash memory after a given event.

Description of Exemplary Future Information Data Structure

In situations where the flash management table is saved after the occurrence of some but not all events, it is useful to also maintain in flash memory a data structure containing information affecting the handling of future events associated with the table. In exemplary embodiments, this future information data structure contains a plurality of records, with each record including data affecting one future event of the flash management system. Although not a limitation of the present invention, it is noted that typically this future information data structure is not updated in flash memory after each event. The future information data structure is useful for maintaining data integrity for situations in which updated table(s) (i.e. updated in accordance with a latest event of the flash memory system) is/are not always saved in flash memory.

For embodiments in which data integrity is provided (i.e. even if there is loss of power), typically, at any given moment of time, one of the following conditions is true: a) a table updated in accordance with a most recent event is stored in the flash memory, b) a table updated in accordance with an earlier state (i.e. earlier than a most recent event, meaning that other events have transpired in the flash memory system since the "earlier" event) is stored in flash memory, and the future information data structure stored in flash memory includes information related to all events that have transpired since the time of the "earlier event."

One exemplary implementation of the future information data structure is an ordered list in which information guiding the handling of the next few events that affect the state of the system (i.e. the state of the "at least one aspect of the system" stored in the one or more flash management tables) is provided, be it an external write command, an internal housekeeping operation, or any other event affecting the state of the system.

It will be appreciated that a future information data structure may be stored in any location in flash memory, and not necessarily physically adjacent to the flash management table the future information data structure is associated with.

As shown in FIG. 3, the flash management table(s) is/are saved 230 into flash memory for some but not for all events of the flash memory system (i.e. only for events for which a "save table" condition has been met 226—this condition is discussed below). Thus, in some embodiments, whenever (a) flash management table(s) is/are saved to flash memory, an updated future information data structure is also saved 234. At this time, the flash management table(s) saved in the flash memory is/are said to be "synchronized to a latest state" or "latest event" of the flash memory system. Even though not explicitly shown in FIG. 3, it should be understood that it is advisable (even though not essential for the use of the present invention) to keep a copy of the most recently saved future information data structure in RAM memory, so that handling of future events can take place without having to access the non-volatile memory for retrieving the future information data structure.

Referring to step 230, it is noted that when a table indicative of the current state of the flash memory system is saved in the flash memory, this is defined herein as "synchronizing the table in flash memory to a current state."

Overall, the process in which the flash management table(s) is/are stored in flash memory after various events (but not necessarily after all events) is defined herein as "maintaining the table in flash memory." At different points in time, another version of the flash management table(s) (typically, each subsequent version indicative of a later state of the flash memory system) is thus stored in flash memory. Thus, the "maintaining the table in flash memory" does not require that for any given moment the table most recently saved in the flash memory is synchronized with the current state of the flash memory system. Inspection of FIG. 3 indicates that there usually are periods of time during which the most recently stored flash memory table(s) are indicative of an earlier state of the flash memory system (i.e. a state of the system before more recent events occur in the flash memory system).

It is noted that the future information data structure may later be retrieved from the flash memory, for example, after power up of the flash system. By inspecting the data structure (as is further explained below), it is determined at any given time whether or not the saved flash management table(s) reflect(s) the most recent state (i.e. the aspect of the state represented in the table) of the system.

We shall now use the flash management table example of FIGS. 2A and 2B for presenting a non-limiting example of a future information data structure. The flash management table of FIGS. 2A and 2B provides a mapping from virtual block numbers to corresponding physical block numbers. During system operation the state of the table changes whenever the flash management software allocates a free physical block to a given virtual block, at the same time freeing the previous physical block corresponding to that virtual block.

The future information data structure associated with that table according to an exemplary embodiment of the present invention is an ordered list of currently free blocks. The list defines the exact order according to which free blocks will be allocated in the future. In other words, the next time the flash management software allocates a free block it is guaranteed that the flash management software will select the block at the head of the list. The second time the flash management software allocates a free block, it is guaranteed that the flash management software will select the block in the second entry in the list, and so on.

It should be noted that, typically, each physical block contains within itself the number of the virtual block that that physical block is currently assigned to. This fact allows the flash management software to reconstruct the present state of the table from the saved (and not up-to-date) version of the table and from the table's associated future information list, as is explained below in the discussion of the system's wake-up process.

Policies for Determining when to Save (an) Updated Flash Management Table(s) to Flash Memory Any policy for determining what constitutes an event for which the updated table is saved into flash memory—i.e. the "save condition" of step 226—is within the scope of the present invention.

The scope of the present invention includes a number of policies for determining when to save (an) updated flash management table(s) to flash memory in accordance with particular embodiments of the present invention.

In a first embodiment, a table is saved every Nth change of state of the table, where N is pre-determined. N can be as small as 2 when the saving overhead is low, or N can be as high as 100 or even more, for example, when the saving overhead is high. Thus, a counter variable is initialized to be zero. After each event, this counter variable is incremented. If the counter variable exceeds the pre-determined value N, one or more tables are saved to flash memory, and the future information data structure associated with those tables is re-calculated and stored in flash memory together with the table(s).

In a second embodiment, the "save table" condition is determined in accordance with the change of state triggered by a most recent event. For that purpose state changes are classified as either 'minor' changes or 'major' changes. Changes in the table state that are minor do not cause an immediate (i.e. before processing 210 the next event) saving of the table (i.e. the "NO" branch after step 226), while changes that are major do cause an immediate saving. A non-limiting example for a classification of changes to minor and major in the case of a free blocks flash management table is that a change that changes a free block into a non-free block is considered minor, while a change that changes a non-free block into a free block is considered major.

In a third embodiment the table(s) is/are saved periodically, whenever a pre-determined time interval expires. There is typically a tradeoff between how often the table(s) is/are updated, and the amount of system resources expended in saving the flash management table(s) to flash memory. On the other hand, saving the management table(s) more often means that, on average, a table retrieved from flash memory during wake-up is more likely to be more updated, thereby providing for a faster wake-up. It is noted that any time interval is within the scope of the present invention. In exemplary non-limiting embodiments, the time interval is between a tenth of a second and 5 or more minutes.

In a fourth embodiment, the frequency of updating a table is determined in accordance with an availability of system resources. In one example, when controller 140 handles many read/write/erase requests, or during a period of time when there are many housekeeping operations, the flash management table(s) is/are saved to flash memory less often, in order to conserve system resources. During periods of "low usage" when the system is otherwise idle or subjected to a low level of usage, it is usually possible to save the flash management table(s) to flash memory more often without a significant impact upon flash system performance. Saving the flash management table(s) more often to flash may often allows for a faster wake-up, especially in situations when there was not an orderly exit (for example, an unexpected power loss).

Other embodiments for policies of when to save a flash management table to flash memory are also possible.

When (a) flash management table(s) is/are saved to the flash memory the accompanying future information data structure preferably should contain enough information to support the handling of all future events until the next saving will occur. It is advisable to provide a safety margin and prepare for more events than are expected to take place until the next saving. In the context of the present example, we may prepare a list of free blocks to be used next that contains more free blocks than are expected to be needed until the next saving. However, the invention is not dependent on this to be the case and correctly handles all events even if eventually it turns out that all stored future information was already used and an additional event is received. In such a case we just do an immediate synchronization of the table to the flash, as if a "Save Condition" has been met. For simplicity, this case of running out of future information is not shown in FIG. 3.

As not every state change triggers a saving of the table, a gap or a mismatch is eventually created between the last saved copy of a table and the table's most updated copy in RAM. Whenever the table is saved, the gap is eliminated and the two copies (i.e. the copy in volatile RAM memory and the copy stored in flash memory) become identical, but subsequently new changes of state that do not cause saving of the table create a gap again.

Waking-Up

In some embodiments, when an application makes an orderly exit, updated flash management table(s) (i.e. (a) flash table(s) updated in accordance with most recent events of the flash memory system) is/are saved to flash memory. When the flash memory system wakes up, these flash management table (s) are then retrieved from flash memory.

When there is no orderly exit, it is possible, when waking up, to retrieve the "out of date" flash management table(s) from flash memory into volatile memory, and then, in accordance with information stored in the future information data structure, to update, in volatile memory, the out of date flash management table.

Thus, embodiments provided by the present invention obviate the need to invalidate out of date tables as done in Lasser U.S. Pat. No. 6,510,488.

Figure 4:
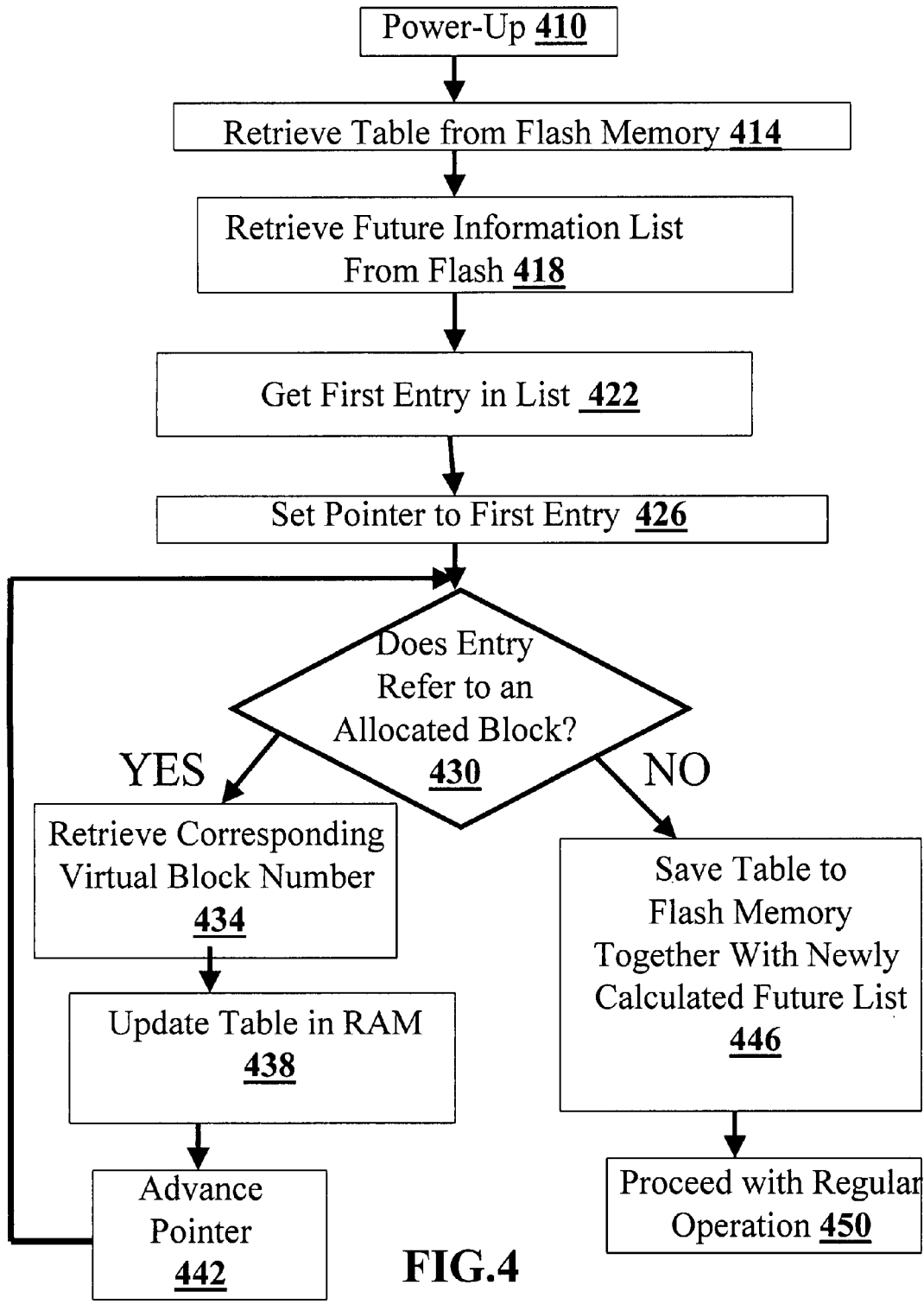
FIG. 4 is a flow chart of an exemplary routine for waking up.

FIG. 4 is a flow chart of an exemplary wake-up routine in accordance with some embodiments of the present invention. FIG. 4 presents an exemplary wake-up routine in the context of the previous example of the table of FIGS. 2A and 2B with the future information data structure being an ordered list of free blocks that are next in line for allocation. After powering up 410, the flash management system retrieves 414 the saved copy of a flash management table. Then the flash management system retrieves 418 the associated future information list that was saved at a time that the flash management table was saved to the flash memory.

Next the flash management system gets 422 the first physical block number in the list, and also sets a pointer 426 to point to the first entry of the list.

If the system was shut down immediately following the last saving of the flash management table and before an additional change of state of the table occurred (for example, if there was an "orderly exit," or in any other situation), then the first block in the list should still be free. If, however, one or more state changes of the flash management table(s) occurred after the last saving of the table and before system shut down, then the first block in the list should now be in use.

The power-up flash management software can determine whether a physical block is currently in use or not. This can be determined independently of any flash management table by reviewing the contents of one or more control fields contained within the block. In some flash management systems it suffices to look for the "corresponding virtual block number" control field—if a valid virtual block number is specified there then the block is in use, and if the field does not contain a valid virtual block number then the block is not in use. In other flash management systems the determination of whether a physical block is currently free or not requires the review of more than a single control field, but in all cases such determination is relatively straight-forward and fast to do.

Thus, by applying the above techniques of determining the "free" status of the first physical block in the future information list, the flash management software can determine whether there is a discrepancy between the retrieved table and the "true" table that would reflect the system's present state.

If it is found that the first block in the list is allocated we know we should update the retrieved table. We then retrieve 434 from the first block, the block's current corresponding virtual block number. This allows us to update the table in RAM 438 to reflect the current correspondence between the virtual and physical block numbers. The physical block indicated by the retrieved table to correspond to that virtual block (which is now known to have been replaced by the first block in the list) is no longer pointed to by the table as that physical block is not in use at the current time.

Next the pointer into the list is advanced 442 and the same process is repeated for the next physical block in the list. As long as the inspected block is found to be in use, the table in RAM is updated to reflect the event of allocating that block.

Eventually we reach a point where the inspected physical block is found to be free. This implies that no more updates to the table in RAM are required and the table now correctly represents the state of the system. At this point the updated table is stored into the flash memory 446. At the same time a newly calculated future information list (indicating the next to be allocated free blocks) is also stored into the flash memory, so that if the system shuts down again the same power-up routine can again restore the correct state of the table. Note that step 446 of saving the table to the flash memory is not really necessary in case it is found that no block from the future list was allocated, as in such case the stored table is already up-to-date. For simplicity this is not shown in FIG. 4.

After it is determined that the flash memory table(s) are updated in volatile memory and in non-volatile memory, it is possible then to proceed 450 with regular operation of the flash memory system.

It is interesting to note that the methods of the present invention are in some sense the exact opposite of the methods of Lasser '056. Both methods have a lot in common—they both update the flash management tables in flash memory only occasionally, allowing the creation of a gap between the stored state and the current state. They both handle this gap by "playing back" an iterative update process at power-up time according to information stored in the flash that uniquely defines the events that are responsible for creating the gap. However, there is a basic difference between the methods regarding this information—Lasser '056 handles the incoming events according to the specific algorithms of the flash management system, whatever they may be, and then records the events into the flash in a way that represents how those events happened to be handled. The present invention first records into the flash how incoming events should be handled in the future (again according to the algorithms of the flash management system but before the events occur) and then when the events actually occur handles them according to the stored handling decisions.

General Discussion About Performance

One benefit provided by certain embodiments of the present invention is that the reading of the saved copy of a flash management table plus the updating of the table for the events not yet reflected in the saved copy of the table typically takes much shorter time than the re-creation of the table from scratch by scanning the many blocks of the storage system. If the system was shut down after saving the table before additional state changes occurred (for example if there is an orderly exit, or if we are "lucky" enough to shut down before any new events had occurred), then the wake-up time, in some embodiments, is fast, the same as in the method of Lasser '488 when an orderly shutdown takes place. But even if some state changes took place after the last saving of the table, the wake-up time of the system may not be as bad as occurs in the method of Lasser '488 when there was no orderly shutdown. In many situations, only a few events have to be detected and their effects on the tables' state re-created. The exact time this takes typically depends on the number of entries that have to be handled from the future information data structure. This in turn may depend on the frequency with which the table is saved to non-volatile memory. The higher the frequency the fewer entries that are to be handled on average and the faster the wake-up on average. On the other hand, the higher the saving frequency the longer the time spent in calculating and preparing the future information data structure.

In the above aspects the present invention is similar in performance to the methods of Lasser '056. But this is so only when the overhead spent for writing the events log of Lasser '056 does not add extra overhead, as for example when the log is kept anyway for other reasons. When this is not the case, the use of the methods of the present invention provides better overall performance than Lasser '056 because the costly maintain of the log is no longer needed.

While the above explanations are mainly focused on a single flash management table within the flash management system, the invention is equally applicable to multiple flash management tables, each representing a different aspect of the state of the system. If multiple tables exist, each table is saved using the table's own saving policy, not necessarily at the same points in time. On power-up, each flash management table is reconstructed using the methods presented above, using the specific future information data of each flash management table. It is also possible that two or more tables share a common future information data structure, used for guiding the handling of incoming events with respect to those multiple tables.

It should also be understood that the present invention is not limited to the examples presented above and used for explaining the methods of the invention. The invention is equally applicable to many other types of flash management tables and future information data structures, all of which are within the scope of the claimed invention.

Additional Discussion About Presently Disclosed Systems

The presently disclosed techniques may be implemented using any combination of hardware, firmware and software.

In one non-limiting example, the saving of flash management tables and their recovery and reconstruction upon power up are all performed by controller 140, or more precisely—by CPU 150 executing code from ROM 160. This is however not the only system architecture possible for using the present invention. For example, it is also possible that the methods of the invention are implemented by code executed in host computer 110, as will be the case when the storage module is an on-board NAND flash device and there is no stand-alone controller. Another possibility is that the methods of the invention are at least partially implemented by host computer 110 and partially implemented by controller 140. All these architectures and many others are within the scope of the present invention.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

All references cited herein are incorporated by reference in their entirety. Citation of a reference does not constitute an admission that the reference is prior art.

The articles "a" and "an" are used herein to refer to one or to more than one (i.e., to at least one) of the grammatical object of the article. By way of example, "an element" means one element or more than one element.

The term "including" is used herein to mean, and is used interchangeably with, the phrase "including but not limited" to.

The term "or" is used herein to mean, and is used interchangeably with, the term "and/or", unless context clearly indicates otherwise.

The term "such as" is used herein to mean, and is used interchangeably, with the phrase "such as but not limited to".

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

While the invention has been described with respect to a limited number of embodiments, it will be appreciated that many variations, modifications and other applications of the invention may be made.

What is claimed is:

1. A method of maintaining data structures of a memory system that includes a nonvolatile memory having a plurality of blocks, the method comprising storing a first copy of a management table in only a first portion of the plurality of blocks, wherein the plurality of blocks includes the first portion and a second portion;

storing a second copy of the management table in a volatile memory of the memory system;

wherein the management table includes data associated with a first state of the memory system, wherein the first state is associated with a first time;

storing, in only the second portion of the plurality of blocks, a future information data structure, the future information data structure including a record related to an event of the memory system, wherein the event is expected to occur subsequent to the storing of the future information data structure; and responding to an occurrence of the event at a second time that is subsequent to the storing of the future information data structure, wherein responding includes:

modifying the second copy of the management table in the volatile memory in accordance with the future information data structure, wherein the modification is accomplished without scanning the non-volatile memory to determine which blocks are unused blocks;

deciding whether to update the first copy of the management table; and in response to a positive decision to update the first copy of the management table, updating the first copy of the management table in accordance with the future information data structure without scanning the non-volatile memory.

2. The method of claim 1, wherein the nonvolatile memory is a flash memory.

3. The method of claim 1, wherein the updating is performed after N instances of modification of the management table in the volatile memory, where N is a pre-determined integer.

4. The method of claim a 1, wherein the updating is performed responsive to an occurrence of a selected event.

5. The method of claim 1, wherein the updating is performed periodically.

6. The method of claim 1, wherein the updating is performed in accordance with availability of resources of the memory system while the memory system is functional.

7. The method of claim 1, wherein the future information data structure includes a list of blocks of the nonvolatile memory that are free at the first time.

8. A method of waking up a memory system after a shutdown of the memory system, the method comprising:
reading, from a nonvolatile memory of the memory system, a future information data structure that has been stored at the nonvolatile memory at a storage time that is prior to a wake-up time, wherein the future information data structure includes an update record related to an event that is expected to occur subsequent to the storage time; and
when a condition is satisfied, updating a management table in accordance with the update record without scanning the nonvolatile memory to determine which blocks of the non-volatile memory are free blocks prior to the updating, wherein the management table is stored at the nonvolatile memory and wherein prior to the updating, the management table stores first data associated with a first state of the memory system, the first state associated with a first time that is prior to the wake-up time;
wherein the updating is completed prior to writing data, other than data of the management table, to the nonvolatile memory subsequent to the shutdown of the memory system.

9. The method of claim 8, wherein the nonvolatile memory is a flash memory.

10. The method of claim 8, wherein the updating changes said modifies the management table stored at the nonvolatile memory in accordance with a current state of the memory system.

11. The method of claim 8, wherein the condition includes a change in stored contents of the memory system, the change having occurred subsequent to the first time.

12. The method of claim 1, wherein the modifying of the second copy of the management table comprises determining whether a first physical block listed in the future information data structure is currently in use, wherein the determination is made from data stored in a control field of the first physical block.

13. The method of claim 12, wherein the determination is made from only the data stored in the control field.

14. The method of claim 12, wherein when the first physical block is in use, updating the second copy of the management table to reflect usage of the first block.

15. The method of claim 14, further comprising when the first physical block is in use, determining whether a second physical block listed in the future information data structure is in use, wherein the second physical block is listed subsequent to a listing of the first physical block in the future information data structure.

16. The method of claim 15 further comprising, when the second physical block is not in use, updating the first copy of the management table at the non-volatile memory by the replacing the first copy of the management table at the non-volatile memory with a copy of the updated second copy of the management table.

17. The method of claim 8, wherein updating the management table comprises determining whether a first physical block listed in the future information data structure is in use, wherein the determination is made from data stored in a control field of the first physical block.

18. The method of claim 17, further comprising when the first physical block is in use, determining whether a second physical block listed in the future information data structure is in use, wherein the second physical block is listed subsequent to a listing of the first physical block in the future information data structure.

19. The method of claim 18, further comprising when the first physical block is in use and the second physical block is not in use, updating the management table to reflect that the first physical block is in use and the second physical block is not in use.

20. The method of claim 8, wherein the condition is associated with an availability of resources of the memory system while the non-volatile memory is operational.

* * * * *

UNITED STATES PATENT AND TRADEMARK OFFICE
CERTIFICATE OF CORRECTION

PATENT NO.       : 7,769,945 B2                                        Page 1 of 1
APPLICATION NO.  : 11/808451
DATED            : August 3, 2010
INVENTOR(S)      : Menahem Lasser et al.

It is certified that error appears in the above-identified patent and that said Letters Patent is hereby corrected as shown below:

In the Claims section, Column 18, Claim 4, Lines 61 and 62, "The method of claim a 1, wherein the updating is performed responsive to an occurrence of a selected event." should read --The method of claim 1, wherein the updating is performed responsive to an occurrence of a selected event.--.

In the Claims section, Column 19, Claim 10, Lines 28 and 29, "The method of claim 8, wherein the updating changes said modifies the management table stored at the nonvolatile" should read --The method of claim 8, wherein the updating modifies the management table stored at the nonvolatile--.

Signed and Sealed this

Thirtieth Day of November, 2010

David J. Kappos
*Director of the United States Patent and Trademark Office*